United States Patent [19]
Wilson

[11] 3,772,178
[45] Nov. 13, 1973

[54] ELECTRODE FOR CORROSION TEST

[75] Inventor: Homer M. Wilson, Houston, Tex.

[73] Assignee: Petrolite Corporation, St. Louis, Mo.

[22] Filed: Aug. 25, 1972

[21] Appl. No.: 283,871

Related U.S. Application Data

[60] Continuation of Ser. No. 66,950, Aug. 26, 1970, abandoned, which is a division of Ser. No. 764,884, Oct. 3, 1968, Pat. No. 3,558,462.

[52] U.S. Cl.......... 204/195 C, 204/286, 204/297 R, 204/1 T, 204/280
[51] Int. Cl. .......................................... G01n 27/46
[58] Field of Search .............. 204/1 T, 195 C, 196, 204/197, 280, 286, 297 R; 324/71 R, 71 E; 287/125, 127 R, 127 E; 339/263 R, 263 B

[56] References Cited
UNITED STATES PATENTS

| 1,615,233 | 1/1927 | Redinger | 287/125 |
|---|---|---|---|
| 1,849,510 | 3/1932 | Thomson | 287/125 |
| 3,409,319 | 11/1958 | Van Hecke | 287/125 |
| 3,495,123 | 2/1970 | Raddatz | 287/127 E |
| 2,805,987 | 9/1957 | Thorn et al. | 204/197 |
| 3,303,118 | 2/1967 | Anderson | 204/280 |
| 3,406,101 | 10/1968 | Kilpatrick | 204/195 |

FOREIGN PATENTS OR APPLICATIONS

| 1,047,030 | 11/1966 | Great Britain | 204/196 |

Primary Examiner—T. Tung
Attorney—Emil J. Bednar et al.

[57] ABSTRACT

An electrode for use in a corrosion test probe assembly, especially in polarization measurements such as described in U.S. Pat. No. 3,406,101. The electrode comprises a metallic (1,020 mild steel) cylindrical rod. An axial bore extends into one end of the rod which carries an annular end sealing surface arranged to engage a fluid seal with fluid tightness. The bore has an enlarged cylindrical portion adjacent the sealing surface, a reduced diameter threaded portion and a further reduced cylindrical portion which terminates in an abutting surface. The rod has a substantially smooth exterior side and imperforate end surfaces exposed to a corrodant, and these surfaces are prepared so that the actual and mathematically derived surface areas on the rod are substantially identical relative to a certain surface area desired in the polarization measurement with which the rod is to be employed. Each electrode will have identical characteristics in the polarization measurement so electrode replacements do not require instrument recalibration nor aging into identical responses in a corrodant.

5 Claims, 5 Drawing Figures

Patented Nov. 13, 1973  3,772,178

Homer M. Wilson
INVENTOR.

BY Emil J. Bednar

ATTORNEY

Patented Nov. 13, 1973

Homer M. Wilson
INVENTOR

BY Emil J. Bednar
ATTORNEY

ELECTRODE FOR CORROSION TEST

This is a continuation of application Ser. No. 66,950, filed Aug. 26, 1970, now abandoned which is a division of application Ser. No. 764,884, filed Oct. 3, 1968, now U.S. Pat. No. 3,558,462.

BACKGROUND OF THE INVENTION

1. Field of the Invention

This invention relates to measuring and testing of corrosion processes, and it relates more particularly to the instruments and electro-chemical techniques used in the study of corrosion processes.

2. Description of the Prior Art

It is often desirable to determine the rates at which metals corrode within a corrosive liquid. For example, corrosion inhibitors are added to aqueous liquids to reduce the corrosion of exposed metals. Instruments are used to measure the rates at which these metals corrode so that the effectiveness of the inhibitor can be determined. The measurement of the rate of corrosion upon metals usually involves an instrument associated with a probe which carries a plurality of electrodes immersed within the corrosive liquid. In refineries, petrochemical plants, and other process industries using large volumes of aqueous fluids, the probes are usually installed within the piping system carrying the fluid desired to be monitored. Additionally, probes have been placed in other uses, such as in monitoring the rate of corrosion of metals forming oil field pipelines containing waters that are employed to stimulate oil production from subterranean reservoirs.

The probes must be readily interconnected into the piping system carrying aqueous fluids so that their electrodes are exposed to the corrodant. Whatever the construction of the probes, their placement into the piping must not create a weakness. For example, probes using plastics for providing insulating functions are not universally acceptable. One reason for this result is the chemical and physical attack in certain aqueous systems containing various corrodants and plastic destroying organic contaminants at pressures up to 15,000 psi and temperatures which can reach 400°F. Under these operating conditions, the probe must not introduce a weakness due to its construction into the piping system. A failure of the probe, by leakage or blowout, can cause a severe economic loss when the piping system provides an essential processing link. Under these circumstances, the entire process must be temporarily interrupted while the probe is being replaced.

In many instances, the probe will be installed within a "bypass" piping circuit so that it can be readily removed. This arrangement permits the field replacement of its electrodes. The field replacement of electrodes in a probe is a great advantage. The probes' electrodes may be replaced to eliminate effects of previous corrosion or exposure to inhibitors. Additionally, the electrodes may be examined to measure the actual weight loss suffered during exposure to the corrosive aqueous medium. However, the exact same surface area exposure must be maintained between electrodes interchanged on the probe. Otherwise, the probe assembly must be recalibrated to insure consistent results in the measurement technique after each replacement of the electrodes. The electrodes will be changed in the field, usually by non-technical personnel. Therefore, the changing of the electrodes cannot require sophisticated measurement or replacement techniques. For example, the exposed surface areas of the electrodes cannot depend upon making a certain measured engagement relative to a mounting or sealing surface.

In addition, the probe assembly itself must not require special handling, placement or tools not normally required in maintaining the piping system. Preferably, the probe assembly looks and is handled like a regular pipe fitting. The probe assembly should not contain any material (other than possibly the electrodes) which is more corrodible in the aqueous fluid than the piping system. Thus, the probe cannot be the weakest link in the piping system.

The probe assembly usually employs a plurality of electrodes which are insulatd from one another and the pipe system. Generally, the electrodes are metals and have identical surface areas exposed to the corrodant. The electrodes in a corrosive liquid undergo certain electro-chemical changes that are related to rates of corrosion of the specific metals. Thus, the rate of corrosion can be correlated with the electro-chemical effects upon the metallic electrodes of a probe assembly immersed in the corrosive liquid.

An electro-chemical process and apparatus especially useful in measuring corrosion rates is described in application Ser. No. 332,399 which was filed Dec. 23, 1963 and now is U.S. Pat. No. 3,406,101. In this technique, there is employed a corrosion rate meter which includes a probe having three electrodes adapted to be exposed to a corrosive liquid, an adjustable current source, an ammeter and a high impedance volt meter as primary components. The adjustable current source applies a small electric current between a "test" electrode and an "auxiliary" electrode. At the same time, the volt meter monitors the polarization potential between the test electrode and a "reference" electrode. The current flow slightly polarizes the surface of the test electrode, and as a result, causes a shift in the potential between the test and reference electrodes. The current flow required to produce 10 millivolts polarization is directly proportional to the corrosion rate of the test electrode undergoing corrosion.

If the corrosion rate is low, a very small current flow will polarize the test electrode. If the corrosion rate is high, much more current flow is required to polarize the electrode. The weight of metal loss from the electrode (by electro-chemical corrosion) is directly proportional to the current flow in accordance with Faraday's Law. Thus, by the use of appropriate constants and adjustment of the exposed surface area of the test electrode, the ammeter can be calibrated directly into any desired units of corrosion rate providing the surface area of the test electrode is kept constant.

Obviously, the initial surface area of the electrode exposed to the corrosive liquid can be adjusted into the desired range. In order to provide symmetry of the probe, and for other reasons, the exposed surface areas of all electrodes are made identical. Thus, if the electrodes are constructed of the same material, such as 1,020 mild steel, any of the electrodes may serve as the auxiliary, test and reference type electrode in electro-chemical techniques for determining the rate of corrosion.

Although the probe can be manufactured with certain identical exposed surface areas of the electrodes, the corrosive liquid causes the exposed surfaces to become pitted and otherwise damaged. Eventually, the probe must be either discarded, or the electro-chemical technique recalibrated for the new characteristics which the electrodes have assumed. Usually the latter occurrence is avoided by substituting a new probe or replacing the electrodes. The probe can be removed and the electrodes refinished to provide a clean, fresh surface exposed to the corrosive liquid. However, the electrodes now will have a different exposed surface area than for which the probe was originally calibrated. Thus, a recalibration is required to maintain the ammeter of the corrosion meter calibrated directly in units of the corrosion rate.

It is the purpose of this invention to provide a test probe assembly which can be readily installed in piping systems without introducing a weakness there into or one requiring special piping techniques. Additionally, the electrodes on the probe assembly can be readily replaced by non-technical personnel without requiring recalibration of the corrosion measurement technique. Thus, the corrosion meter used with the probe assembly will maintain its calibration directly in the units of corrosion rate for which is originally calibrated regardless of repeated electrode replacements.

SUMMARY OF THE INVENTION

In accordance with this invention, there is provide an electrode comprising a cylindrical rod constructed of iron, aluminum, copper, brass, lead, nickel, titanium, tantalum, zirconium, chromium and alloys thereof. The rod has an axial bore extending into one end which carries an end sealing surface arranged to engage a fluid seal with fluid tightness. The bore has an enlarged diameter portion adjacent the end sealing surface, a reduced diameter thread portion intermediate the bore and an abutting surface at the bottom extremity of the bore. The rod has substantially smooth exterior side and imperforate end surfaces whereby the actual and mathematically derived surface areas of the rod are substantially identical relative to the polarization measurement with which the electrode is to be employed.

DESCRIPTION OF SPECIFIC EMBODIMENTS

Figure 1:
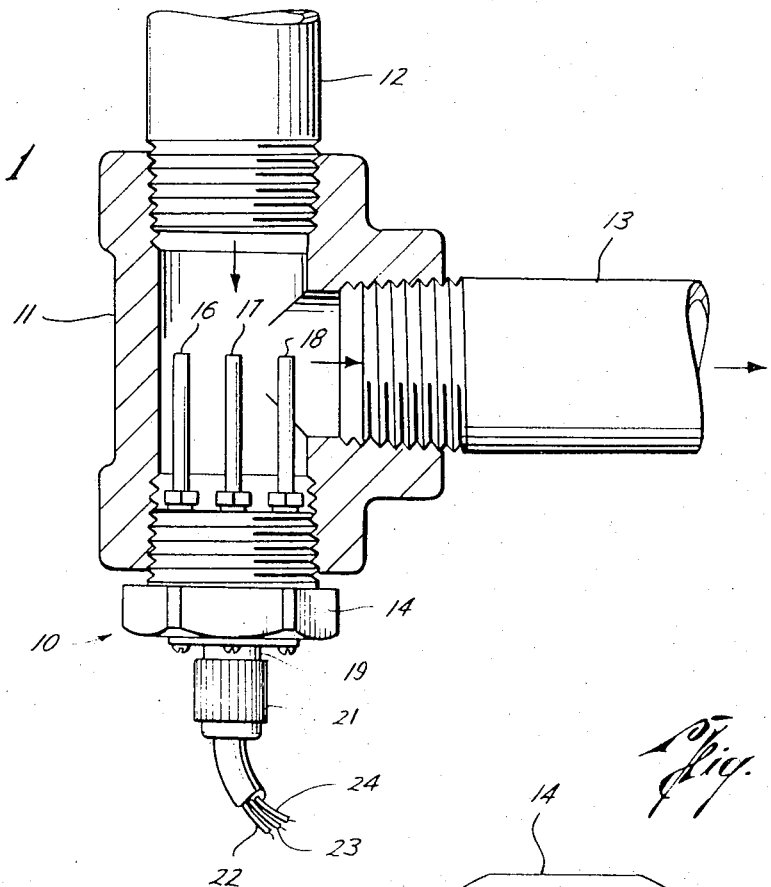
FIG. 1 is a prospective view, partially in cross section, of the probe assembly using the electrode of this invention installed within a tee of a conventional piping system.

In FIG. 1 there is illustrated one embodiment of a corrosion test probe assembly 10 which is secured within a tee 11 forming an interconnection between pipes 12 and 13 in a piping system carrying aqueous fluids whose corrosive effect is desired to be determined. The piping system dimensions are uncritical to the present invention, but for illustration, the pipes 12 and 13 may be of 2 inches internal diameter. The aqueous fluids flow through the piping system in a direction shown by the arrows. The probe assembly 10 is comprised by a metallic body 14 on which are carried replaceable electrodes 16, 17 and 18. These electrodes are interconnected within the body 14 by insulated electrically conductive means to a multi-connector electric fitting 19 carried on top of the body 14. Electrical connection to a corrosion rate meter (not shown) is by a cable connector 21 interconnecting conductors 22, 23 and 24 to the electrodes 16, 17 and 18, respectively, of the probe assembly 10.

The probe assembly 10 can be constructed of any suitable form so that it can be readily secured to the piping system carrying the aqueous fluids to be monitored. Preferably, the body 14 is constructed from a metallic pipe plug compatible with the piping system. Thus, the top portion of the body 14 has a polygonal configuration and a lower cylindrical portion having a threaded exterior side surface.

Figure 2:
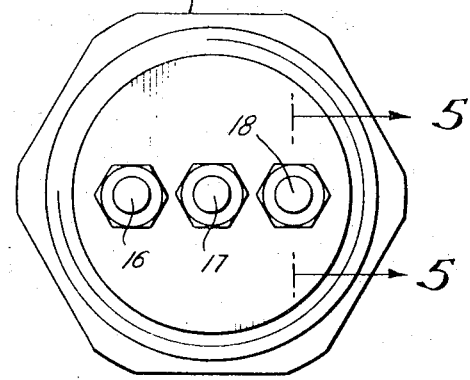
FIG. 2 is an enlarged bottom (fluid-side) view of the probe assembly shown in FIG. 1.

Referring to FIG. 2, the electrodes 16, 17 and 18 extend longitudinally from the bottom of the body 14 in side-by-side relationship. It is preferred for better measurements, to mount the electrodes diametrically aligned along the bottom of the body 14 rather than in a triangular or other relationship where electrical coaction between the electrodes occurs in the corrodant.

Figure 3:
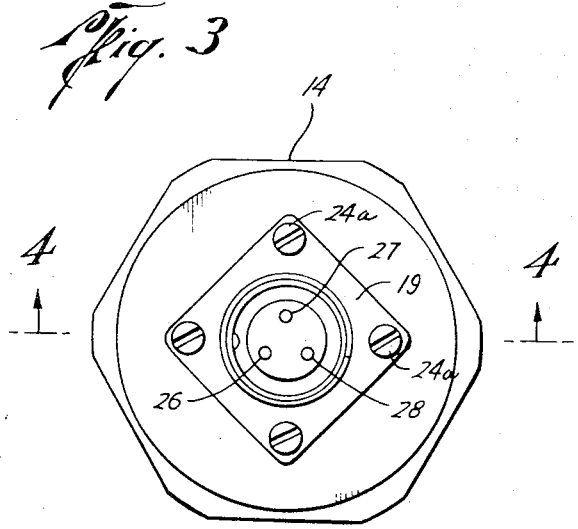
FIG. 3 is an enlarged top (atmospheric-side) view of the probe assembly shown in FIG. 1.

Referring to FIG. 3, the multi-pin fitting 19 is secured by means of screws 24 to the top of the body 14. The electrodes 16, 17 and 18 are electrically connected to the pins 26, 27 and 28, respectively, in the fitting 19. There are no exposed electrical connections between the electrodes and the fitting 19. As a result, the probe assembly 10 can be handled as another pipe fitting during installation.

Figure 4:
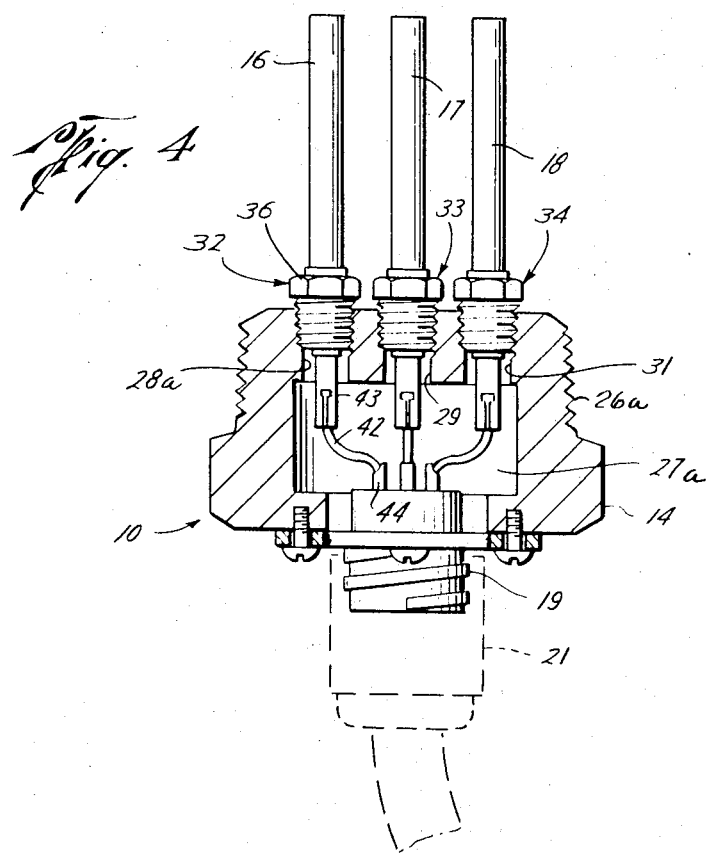
FIG. 4 is an enlarged view, partially in cross-section, taken along line 4—4 of the probe assembly shown in FIG. 3.

The construction of the probe assembly 10 can be seen in greater detail in FIG. 4. The body of 14 carries external threads 26 which are adapted to interengage with the interior threads in the tee 11. A cavity 27, preferably cylindrical, is provided from the top of the body 14 to a region adjacent the lower cylindrical portion carrying the threads 26. The configuration of the cavity 27 is unimportant other than in providing sufficient room in which to accommodate the electrical connections between the electrodes and the fitting 19. The lower portion of the body 14 is provided with a plurality of paralleled passageways 28, 29 and 31. The passageways are threaded, at least in part, to receive insulating members 32, 33 and 34 to which the electrodes are secured. Since the insulating members are identical, only insulating member 32 will be described in detail.

Figure 5:
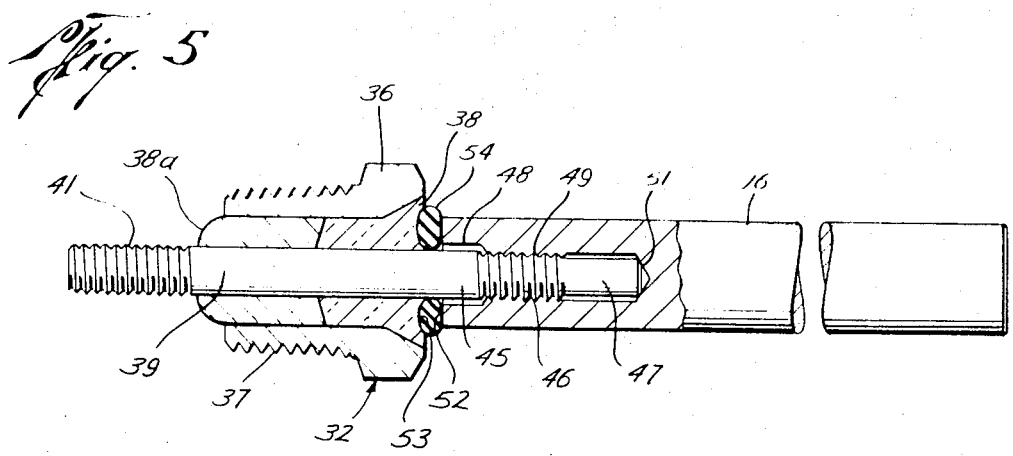
FIG. 5 is an enlarged view partially in cross-section taken along line 5—5 of one electrode and associated elements of the probe assembly shown in FIG. 2.

The insulating member 32, as seen in FIGS. 4 and 5, is provided by an exteriorly threaded metallic sleeve 36 which carries threads 37 to interengage with the threads in the passageway 28. The sleeve 36 may carry a polygonal external surface that is readily engaged by various pipe tools as can be best seen by momentary reference to FIG. 2. A glass element 38 is secured against displacement by compression and a flared shoulder within the sleeve 36. A metallic pin 39, extends centrally of the insulating member 32 and in fluid tightness through the glass element 38. The glass element 38, sleeve 36 and pin 39 are sealed in fluid tightness by fusion. Thus, the glass element 38, pin 39 and sleeve 36 are formed with glass-to-metal seals. The end of the pin 39 within the cavity 27 is provided with a thread 41, or other attaching surface, onto which electrical connection may be made. More particularly, electrical conductor 42 is secured to the threads 41 by terminal clip 43. The other end of the conductor 42 is secured to a terminal lug 44 which is electrically common to the pin 26 of the fitting 19. The electrical connections between the electrodes 17 and 18 through the insulating members 33 and 34 are made in identical manner.

The electrode 16 is releasedly secured to the pin 39 in any convenient manner. Preferably, the interconnection is by threads so arranged that a positive electrical and mechanical connection is made while also providing a fluid-tight seal between the electrode 16 and the glass element 38. For this purpose, the pin 39 is cylindrical with a full diameter portion 45 adjacent the glass element 38, an intermediate threaded portion 46 and a reduced diameter portion 47. The electrode 16 has an axial bore 48 formed into one of its ends which carries a seal engaging surface. The bore 48 has a reduced diameter threaded portion 49 which interengages with the threaded portion 46 of the pin 39. The bottom of the bore 51 has an abutting surface to engage a complimentary surface upon the end of the reduced diameter portion 47 of the pin 39. Thus, the electrode 16 is threaded upon the pin 39 until a metal-to-metal contact occurs between the abutting surfaces on the pin 39 and the bore 48 of the electrode 16. A space is provided between the presented faces 52 and 53 of the electrode 16 and the glass element 38, respectively, by the length of the full diameter portion 45 with the electrode 16 and pin 39 in abutting relationship. The space between the presented faces 52 and 53 provides a precise dimension in which to receive an insulating fluid seal 54 into fluid tight engagement. Although any type of fluid seal may be employed, it is preferred to employ an O-ring formed of Viton (tradename). The seal 54 encircles the pin 39 is compressed within the precise space distance to serve effectively as pressure seal. The seal 54 keeps certain corrosive fluids from causing bimetallic contact corrosion along the threaded joint between pin 39 and electrode 16. Thus, the electrode 16 does not need to be threadedly adjusted on the pin 39 to place the fluid seal 54 into a certain compression. The metal-to-metal abutment between the pin and electrode, and the precise space thereby provided, create the sealing function.

The electrodes 17 and 18 use identical structures for their mounting upon the insulating means 33 and 34 as has been described for the element 16.

It will readily be seen that the probe assembly 10 may be placed as would an ordinary pipe plug into piping systems without depending upon plastics, or other types of deteriorating seal materials to prevent leakage of corrosive fluids. The arrangement of the insulating member 32 with the glass element 38, provides an excellent fluid seal which is mechanically strong. The hermetic properties of this arrangement depend upon a fusion between the glass element 38, the sleeve 36, and the pin 39, plus a certain control compression created by the differential shrinkage of the sleeve 36 about the glass element 38. The glass element 38 need not extend substantially the depth of the sleeve 36. The glass element 38 may extend only partially into the sleeve 36 with the remaining opening about the pin 39 filled with a glass sleeve 38a which is held in place by a cementitious material. The function of the glass sleeve 38a is merely to fill an opening into which moisture or debris may otherwise accumulate. The upstream placement of the glass element 38 provides the necessary mechanical and electrical functions within the insulating member 32.

In the insulating member 32, the sleeve 36, the glass element 38 and the pin 39 are arranged of suitable materials that have compatible coefficients of expansion and that provide the desired hermetic seal by fusion and compression properties. Additionally, the glass element 38 has significant structural strength, good chemical resistance and excellent electrical properties. The glass element 38 is relatively insensitive to thermal and mechanical disruption. Thus, the probe assembly 10 does not depend on polymeric plastics to provide either mechanical or electrical functions. The glass element 38 is capable of withstanding substantial amounts of fluid pressure under rigorous operating conditions.

The body 14 may be replaced, with or without new electrodes, whenever leakage occurs in any threaded joint.

The electrodes employed with the body 14 are of special utility since they can be readily replaced as often as is desired without changing the accuracy of corrosion rate determinations. Since one end surface of each electrode is always sealed against the seal 54, essentially dimensionally and surface smooth identical metallic electrodes provide substantially identical exterior side surface areas exposed to the aqueous medium. The electrodes are formed by common manufacturing techniques from a cylindrical rod which is given smooth exterior side and imperforate end surfaces. These surfaces of the rod are stress-relieved for example, a rough cylindrical rod is machined by turning, boring, and threading into the properly dimensioned electrode. Then, the electrode (with machined-marked surfaces) is provided a satin-like smooth finish by peening with glass beads projected at a high velocity upon the machined surfaces. The peening is sufficiently thorough that the actual and mathematically derived surface areas are substantially identical within the calibrated accuracy of the polarization measurement. Thus, the electrodes may be readily exchanged in the probe assembly 10 without requiring recalibration of the corrosion rate meter with which the probe assembly is associated.

The electrodes especially suited for use in the probe assembly 10 may be constructed of any suitable conductive material. Preferably, the electrodes are fabricated from 1,020 mild steel and may have a total surface are of 9.0 square centimeters each exposed to the corrodant. Although steel has been proved suitable for use as a reference electrode in the present corrosion test probe assembly, the theory of the technique indicates that other materials and metal alloys may be employed. Materials such as iron, aluminum, copper, brass, lead, nickel, titanium, tantalum, zirconium, chromium and alloys thereof may be used under similar conditions. The use of steel is preferred for the electrodes. However, corrosion rates may be determined in a shorter test period at higher temperatures and pressures with the electrodes formed of other materials. Electrodes constructed of the same material are an advantage since all the electrodes respond identically to the corrosive liquid in which the corrosion test is being performed.

Various modifications and alterations in the described probe assembly will be apparent to those skilled in the art from the foregoing description which do not depart from the spirit of the invention. For this reason, these changes are desired to be included within the scope of the appended claims. The appended claims define the present invention; the foregoing description is to be employed for setting forth the present embodiments as illustrative and not limitative in nature.

What is claimed is:

1. An electrode for determining the corrosion rate of a metallic material in an electrolyte, said electrode comprising:
   a. a solid metal rod in the form of a right cylinder having a straight exterior side surface and an imperforate planar end surface at one end of said rod, with said end surface being normal to said side surface and said rod at the other end having an axial bore encircled with an annular planar surface normal to and intersecting said straight side surface, said annular surface adapted to seal in fluid tight engagement to a resilient seal;
   b. said axial bore having an enlarged diameter portion with a smooth sidewall adjacent said end carrying said annular planar surface, a threaded portion of reduced diameter adjacent said enlarged diameter portion and intermediate the longitudinal extent of said axial bore, a coaxially aligned cylindrical portion having a straight sidewall and of substantially the same diameter as that of said threaded portion extending between said threaded portion and a conical abutting surface concentrically positioned at the interior terminus of said axial bore; and
   c. said straight side surface and said imperforate planar end surface of said metal rod having a stress-relieved surface with a smooth finish and being adapted to be exposed to the electrolyte during corrosion rate determinations.

2. The electrode of claim 1 wherein said rod is of a material selected from the group consisting of iron, aluminum, copper, lead, nickel, titanium, zirconium, chromium and alloys thereof.

3. The electrode of claim 2 wherein said rod is of 1,020 mild steel and said straight exterior side surface and said imperforate end surface exposed to the electrolyte have a total surface area of 9.0 square centimeters.

4. The electrode of claim 1 wherein said straight exterior side surface and said imperforate end surface of said rod having substantially identical actual and mathematically derived surface areas.

5. The electrode of claim 1 wherein said annular seal-engaging, abutting planar surface has a finish suitable for engaging a resilient seal in compression during angular movement of said rod against a resilient seal without injury thereto.

* * * * *

UNITED STATES PATENT OFFICE
CERTIFICATE OF CORRECTION

Patent No. 3,772,178  Dated November 13, 1973

Inventor(s) Homer M. Wilson

It is certified that error appears in the above-identified patent and that said Letters Patent are hereby corrected as shown below:

Column 1, line 54, for "probes'", read ---probe's---;

Column 2, line 14, for "insulatd", read ---insulated---;
         line 34, for "volt meter", read ---voltmeter---;

Column 3, line 14, for "there into", read ---thereinto---;
         lines 50 and 54, for "cross-section", read ---cross section---;

Column 4, line 26, for "24", read ---24a---;
         line 34, cancel "of";
         line 35, for "26", read ---26a---;
         line 36, for "27", read ---27a---;
         line 39, for "26", read ---26a---:
         line 40, for "27", read ---27a---;
         line 44, for "28", read ---28a---;
         line 53, for "28", read ---28a---;

Column 5, line 35, after "pin 39", insert ---and---;
         line 47, for "element", read ---electrode---;

Column 6, line 30, after "stress-relieved", insert a period (.) and capitalize "for"; and
         line 48, for "are", read ---area---.

Signed and sealed this 6th day of August 1974.

(SEAL)
Attest:

McCOY M. GIBSON, JR.                    C. MARSHALL DANN
Attesting Officer                      Commissioner of Patents